No. 637,645. Patented Nov. 21, 1899.
S. B. McHENRY.
VEHICLE HUB.
(Application filed Mar. 13, 1899.)

(No Model.) 2 Sheets—Sheet 1.

Witnesses
S. Brashears
M. F. Haskell

Inventor
Saml B. McHenry
per O. E. Duff
Attorney

THE NORRIS PETERS CO., PHOTO-LITHO., WASHINGTON, D. C.

No. 637,645. Patented Nov. 21, 1899.
S. B. McHENRY.
VEHICLE HUB.
(Application filed Mar. 13, 1899.)
(No Model.) 2 Sheets—Sheet 2.

Witnesses
S. Brashears
M. M. Haskell

Inventor
Saml. B. McHenry
per O. O. Duffy
Attorney

UNITED STATES PATENT OFFICE.

SAMUEL B. McHENRY, OF CHICAGO, ILLINOIS.

VEHICLE-HUB.

SPECIFICATION forming part of Letters Patent No. 637,645, dated November 21, 1899.

Application filed March 13, 1899. Serial No. 708,875. (No model.)

*To all whom it may concern:*

Be it known that I, SAMUEL B. MCHENRY, a citizen of the United States, residing at Chicago, in the county of Cook and State of Illinois, have invented certain new and useful Improvements in Vehicle-Hubs, of which the following is a specification.

My invention has relation to the wheels of bicycles and other vehicles in which pneumatic tires are applied to the wheels, the object of the invention being to provide a hub of improved construction the use of which in a wheel will dispense with the necessity of using pneumatic tires, the construction of my improved hub being such that the elasticity and resiliency usually secured by using pneumatic tires will be obtained by the use of this hub.

With this object in view my invention consists in the improved construction, arrangement, and combination of parts hereinafter fully described and afterward specifically pointed out in the claims.

Figure 1:
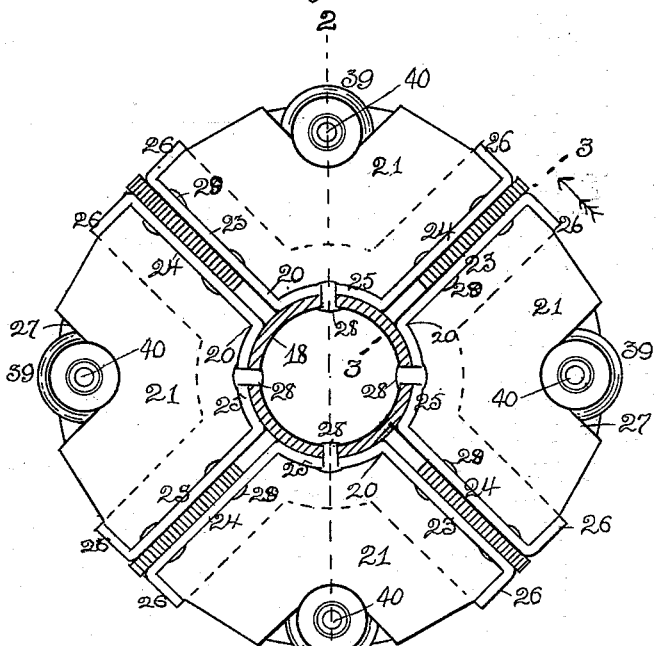
Figure 2:
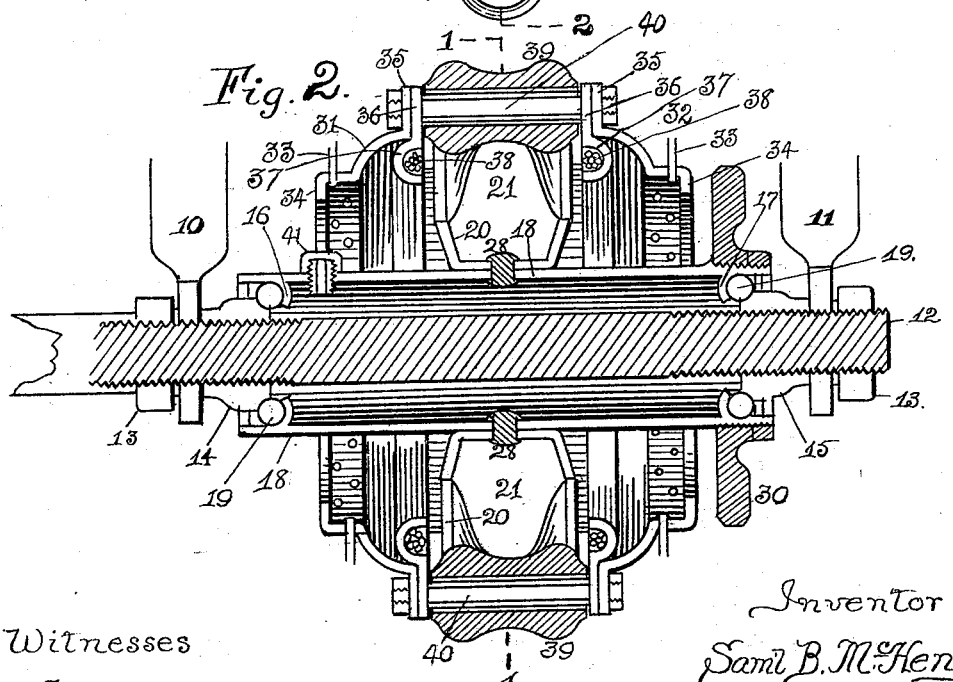
Figure 3:
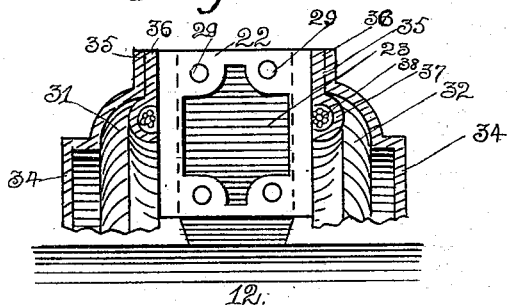
Figures 4, 5:
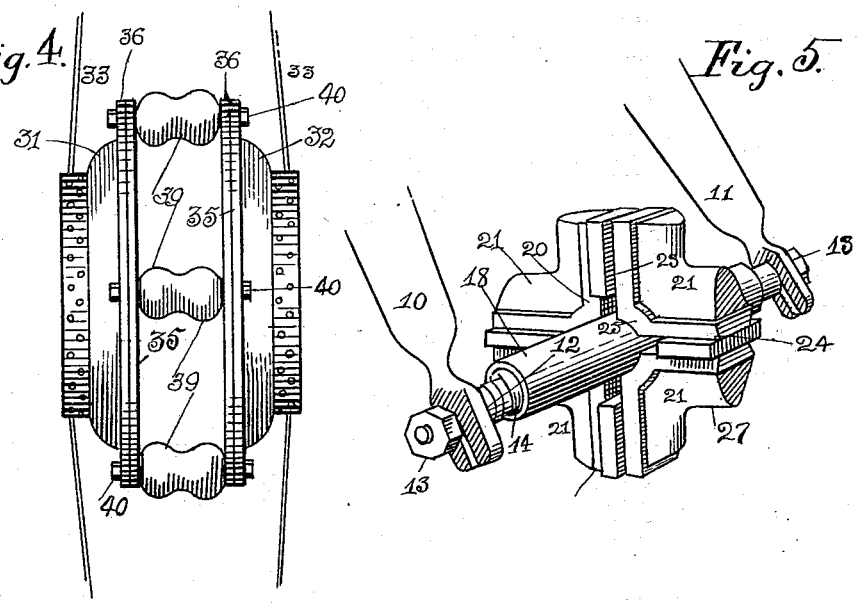
Figures 6, 7:
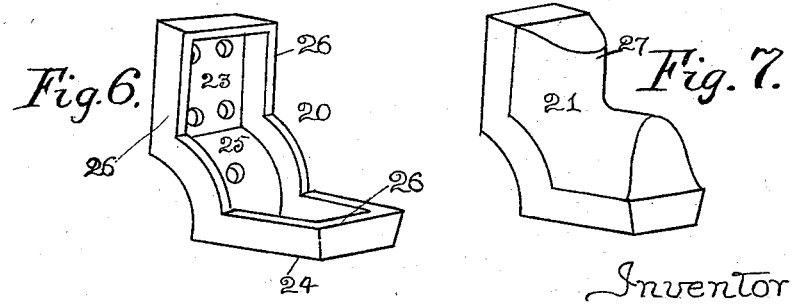

In the accompanying drawings, Figure 1 is a transverse vertical section through a hub on the dotted line 1 1 of Fig. 2 constructed in accordance with my invention. Fig. 2 is a longitudinal vertical section on the dotted line 2 2 of Fig. 1. Fig. 3 is a detail sectional view on the radial dotted line 3 3 of Fig. 1. Fig. 4 is a view of a hub in side elevation, parts of spokes being also shown, the parts illustrated in Fig. 5 being omitted. Fig. 5 is a detail perspective view illustrating a rear axle of a bicycle mounted in the ends of the rear forks of the frame with the stationary parts of my hub thereon. Fig. 6 is a detail perspective view illustrating one of the cups for holding the rubber cushions. Fig. 7 is a detail perspective view illustrating one of the rubber cushions.

Like numerals of reference mark the same parts wherever they occur in the various figures of the drawings.

Referring to the drawings by numerals, 10 and 11 indicate the lower bifurcated or notched ends of the rear forks of the frame of a bicycle, and 12 the rear axle of a bicycle, secured in said ends in any usual or ordinary manner, nuts 13 being used in this instance.

14 15 indicate the outer sleeves (or "cones," as they are generally denominated) of ball-bearings, the inner members 16 17 (or cones) being formed or secured in the long sleeve or box 18 of the wheel, the balls 19 being seated between the cones in the usual manner.

20 indicates one of the "cups," so called, of which there are four, in which rubber cushions 21 are seated, one of the cups being shown detached in Fig. 6 and one of the rubber cushions in Fig. 7. These four cups are shaped so that when arranged around the sleeve 18 they will entirely surround it, except that spaces are left to receive separator-plates or partitions 22 between adjacent cups, such partitions being made of hard-tempered steel and projecting slightly beyond the edges of the cups. Each cup consists of a casting comprising flat portions or plates 23 and 24 at right angles to each other and a curved portion or plate 25 between and connecting them, with a flange 26 extending entirely around these portions or plates and at right angles thereto.

The rubber cushions 21 are shaped to fit tightly in the cups and project therefrom in shape of right-angled curved-faced cushions 27. The cups are secured to the box 18 ninety degrees apart by rivets 28, passing through the shell of the box and centrally through the curved portions or plates of said cups. The partitions 22 are secured between the cups by rivets 29, passing through them and the adjacent flat portions of the cups.

The structure thus far described comprises all the parts of my hub which are rigidly secured to the box 18 and directly moved by the rotation of the box, which rotation is effected by means of the sprocket-wheel 30, secured thereon.

31 and 32 indicate the casings of the hub, to which are connected in any approved manner the usual wire spokes 33. These casings are annular and cup-shaped, their inner and outer edge flanges lying at right angles to the box 18, as at 34 34, the central openings being somewhat greater in diameter than the box. Within the outer edge flanges 35 are rings consisting of flat flanges 36, lying against flanges 35, and annular semicylinders 37, projecting outward into the casings 31 and 32, containing wicks or cords 38, saturated with oil or other lubricating fluid. The inner faces of flanges 36 and their semicylinders 37 bear against the side edges of partitions 22 (see Fig. 3) with close sliding contact, and the casings 31 and 32 and their flanges 36 are separated and held at proper distance apart by rollers 39, held by bolts 40, passing through the flanges and rollers and forming the axles or shafts upon which the rollers rotate.

The box 18, being closed at its ends by the ball-bearings, forms an oil-chamber, access to which may be had by removing a screw-cap 41.

In operation the rotation of the box 18 is communicated to the balance of the hub and rim by means of the rubber cushions acting upon the rollers 39, said rollers resting in the angle of the cushions, and the elastic yielding nature of the cushions prevents all jar in communicating such motion. The rollers being supported by the rim of the wheel through the medium of the spokes, the weight of the vehicle and rider is carried by the rubber cushions below the axle. In the rotation of the wheel the cushions are continually coming into and passing out of this supporting position, the weight passing upon and off each cushion in succession, the rubber of the cushions yielding during such operations, causing the roller to rotate slightly and the flanges 36 and lubricator-cords 38 to slide upon the edges of partitions 22, such movements corresponding in extent to the yielding of the cushions as the weight passes upon them.

By practical test I have found that a bicycle provided with a hub constructed as hereinbefore described and with solid-rubber tires rides with less power and greater ease than a bicycle having wheels with ordinary pneumatic tires. All danger of puncture is of course avoided. All necessary vibration and yielding elasticity are provided. The rollers bear the weight and move from side to side of the rubber cushions without excess of rub or wear and tear. The partitions resist lateral movement of the hub-flanges and keep the wheel true on the axle. The lubricating wicks or cords will contain sufficient oil for a day's run and are so placed as to be comparatively well protected from dust and dirt, but mud guards or caps may be used, if desired. The cups are shaped to hold the cushions securely, but also to permit of their removal and replacement when desired without removing any other part. When the propelling power is applied to the wheel, it lifts the weight off the rear part of the cushion and throws it upon the front, and vice versa when the movement is reversed.

While I have illustrated and described what I consider to be efficient means for carrying out my invention, I wish it to be understood that I do not restrict myself to the exact forms and constructions shown, but hold that any slight change or variation therefrom, such as might suggest itself to the ordinary mechanic, would clearly be comprehended in the limit and scope of my invention.

Having thus fully described my invention, what I claim as new, and desire to secure by Letters Patent of the United States, is—

1. In a vehicle-wheel hub, the combination with the box thereof, of set of right-angled rubber cushions secured thereto with their angles pointing inward forming V-shaped seats on their outer surfaces, hub-casings suspended by the spokes and surrounding the hub and cushions, and rollers resting in the cushion-seats and carried by the hub-casings, substantially as described.

2. In a vehicle-wheel hub, the combination with the box thereof of right-angled cups secured thereto with their angles inward and their bottoms extending radially outward, and correspondingly-shaped yielding cushions secured in said cups, substantially as described.

3. In a vehicle-wheel hub, the combination with the box thereof, of right-angled cups secured thereto with their angles inward and their bottoms extending radially outward, correspondingly-shaped yielding cushions secured in said cups, radially-placed metal partitions between the adjacent cups, and bolts securing the partitions between the cups, substantially as described.

4. In a vehicle-wheel hub, the combination with the hub-box, provided with right-angled yielding cushions, with V-shaped outer bearings, of hub-casings inclosing the yielding cushions and carried by the spokes, bolts connecting the hub-casings together, and rollers on said bolts engaging the cushions, substantially as described.

5. In a vehicle-wheel hub, the combination with the hub and its right-angled metal cushion-carrying cups, of the hub-casings carried by the spokes, the annular flanges on the inner sides of the casings, and the metal partitions between the cups projecting into contact with the annular flanges, substantially as described.

6. In a vehicle-wheel hub, the combination with the hub, right-angled metal cups and the cushions carried thereby, of the hub-casings, the inner annular flanges, the metal partitions between the cups projecting into contact with said annular flanges, the bolts passing through the casings and annular flanges, and the rollers on said bolts engaging the cushion, substantially as described.

7. In a vehicle-wheel hub, the combination with the box, its right-angled cushion carrying cups and the metal, radially-placed partitions secured between and projecting beyond the sides of the cups, of the casings carried by the spokes, the annular flat and semicircular grooved flanges secured to the inner sides of said casings in contact with the partitions, and the lubricating wick or cords in the grooves of the annular flanges, in contact with the partitions, substantially as described.

8. The herein-described vehicle-wheel hub, comprising the box, the right-angled cushions in said cups, the partitions secured between and projecting beyond the sides of said cups, the casings carried by the spokes, the inner annular and grooved flanges, lubricating wick or cord in the grooves contacting with the partitions, the bolts securing the casings and annular flanges together, and the rollers journaled on said bolts and resting upon the cushions, substantially as described.

In testimony whereof I affix my signature in presence of two witnesses.

SAMUEL B. McHENRY.

Witnesses:
ROBT. H. BROWNE,
J. H. R. JAMAR.